United States Patent [19]
Munakata

[11] Patent Number: 5,349,453
[45] Date of Patent: Sep. 20, 1994

[54] LIQUID CRYSTAL DISPLAY DEVICE WITH MICROLENSES ON SAME PLANE AS SWITCHING ELEMENTS

[75] Inventor: Masaki Munakata, Saitama, Japan

[73] Assignee: Sony Corporation, Japan

[21] Appl. No.: 929,438

[22] Filed: Aug. 14, 1992

[30] Foreign Application Priority Data

Aug. 23, 1991 [JP] Japan .................. 3-212217

[51] Int. Cl.$^5$ .................. G02F 1/1335; G02F 1/1343
[52] U.S. Cl. ........................................ 359/40; 359/59
[58] Field of Search .................. 359/40, 41, 68, 59

[56] References Cited

U.S. PATENT DOCUMENTS

| 5,126,863 | 6/1992 | Otsuka et al. | 359/41 |
| 5,151,801 | 9/1992 | Hiroshima | 359/40 |

FOREIGN PATENT DOCUMENTS

| 0444872 | 9/1991 | European Pat. Off. | 359/40 |
| 57-157215 | 9/1982 | Japan | 359/40 |
| 60-165623 | 8/1985 | Japan | 359/40 |
| 62-94826 | 5/1987 | Japan . | |
| 3-140920 | 6/1991 | Japan | 359/40 |
| 4-009922 | 1/1992 | Japan | 359/40 |
| 4-050802 | 2/1992 | Japan | 359/40 |
| 4-050816 | 2/1992 | Japan | 359/40 |
| 4-116519 | 4/1992 | Japan | 359/40 |
| 4-177219 | 6/1992 | Japan | 359/40 |

*Primary Examiner*—William L. Sikes
*Assistant Examiner*—Anita Pellman Gross
*Attorney, Agent, or Firm*—Hill, Steadman & Simpson

[57] ABSTRACT

A liquid crystal display device comprises a first substrate which has a plurality of picture element electrodes arranged in a matrix and a plurality of switching elements associated with the respective picture element electrodes to drive the electrodes, a second substrate which is opposed to the first substrate, and a liquid crystal layer provided between the first and second substrates. A micro-lens is formed between the first substrate and each picture element electrode, by which a high contrast ratio is obtained in a totally white display mode.

10 Claims, 5 Drawing Sheets

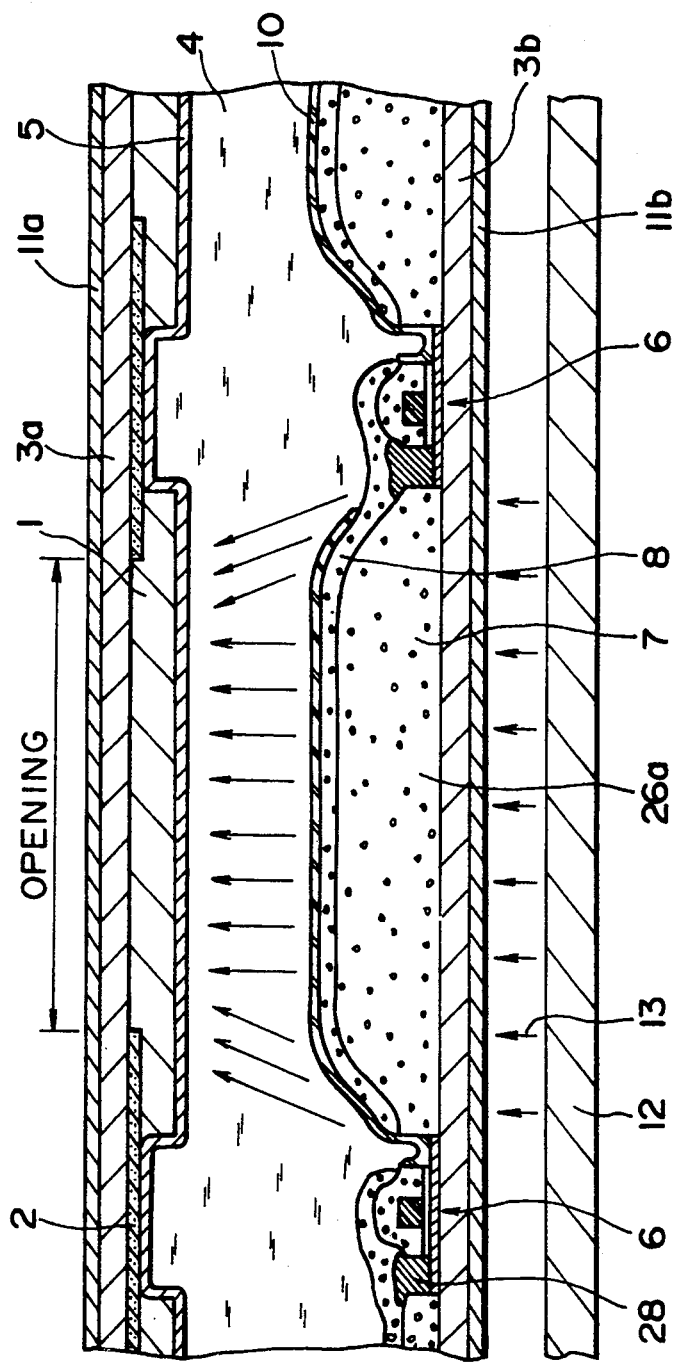

LIQUID CRYSTAL DISPLAY DEVICE WITH MICROLENSES ON SAME PLANE AS SWITCHING ELEMENTS

BACKGROUND OF THE INVENTION

1. Field of the Invention

This invention relates to a liquid crystal display device and more particularly, to an active matrix color liquid display device wherein a high contrast ratio can be obtained.

2. Description of the Prior Art

In known liquid crystal display devices, there is provided a means for lowering a contrast ratio owing to the leakage of light from portions other than picture elements when a totally black display is made in the normally white display mode. For instance, as shown in FIG. 5, portions other than a color filter layer 1, which is a picture element, are covered with a metal film or black matrix layer 2 made of a black resin and serving to absorb light in such a way that the picture element and the film or metal 2 are partly overlapped while taking an exact registration of the picture element into account.

FIG. 5 is a view, partially in section, of a liquid crystal display (LCD) panel which makes use of a substrate on which a polysilicon thin film transistor (poly-Si TFT) is formed as an active switching element. This structure is briefly described. A pair of quartz substrates 3a, 3b which are in face-to-face relation are provided, between which a liquid crystal layer 4 is sandwiched. There are provided between the quartz substrate 3a and the liquid crystal layer 4 a color filter layer 1, a black matrix layer 2 and a common electrode 5. On the other hand, there are provided between the quartz substrate 3b and the liquid crystal layer 4, for example, a thin film transistor (TFT) 6 used as an active switching element, a first PSG layer 7 and a second PSG layer 8, both used as a layer insulating film, and a picture element electrode 10 made of ITO. The TFT 6 drives the picture element electrode 10. The quartz substrates 3a and 3b have, respectively, polarizing plates 11a, 11b for controlling light emitted from or toward outside. Light 13 is passed through a back light module 12. In FIG. 5, shaded regions A of the liquid crystal layer 4 are overlapped regions of the picture element (color filter layer) 1 and the black matrix layer 2. Indicated at 28 is an Al signal line.

When the LCD device having such an arrangement as stated above is displayed as white over the entirety thereof, light is absorbed at the black matrix portions A. This eventually leads to a dark display over the entire picture thereof.

This phenomenon becomes more serious when the high definition of the device is more advanced. This is because the ratio of the black matrix region to the picture element region is increased.

Japanese Laid-open Patent Application No. 62-94826 discloses a liquid crystal display device which includes a substrate on which active switching elements are formed, and another substrate having a color filter at a side opposite to the first-mentioned substrate, on which micro-lenses are formed, by which the picture is made bright with an improved contrast.

However, if a black matrix layer is provided between the color filters in the prior art devices, any incident light is not passed from the black matrix layer portion, resulting in a poorer light transmittance. In addition, the fabrication process undesirably becomes complicated.

SUMMARY OF THE INVENTION

It is accordingly an object of the invention to provide a liquid crystal display device wherein although a black matrix is provided between adjacent color filters, the picture does not become dark in a totally white display and a high contrast ratio is obtained.

It is another object of the invention to provide a liquid crystal display device which can be readily fabricated according to known procedures.

According to one embodiment of the invention, there is provided a liquid crystal display device which comprises:
 a first substrate;
 a plurality of picture element electrodes arranged in a matrix formed on an inner surface of the first electrode;
 a plurality of switching elements each associated with the picture element electrode;
 a plurality of lens elements each disposed between the picture element electrode and the first substrate;
 a second substrate opposed to the first substrate; and
 a liquid crystal layer disposed between the first substrate and the second substrate.

According to another embodiment of the invention, there is also provided a liquid crystal display device which comprises:
 a first substrate which includes an insulating substrate, a plurality of picture element electrodes formed in rows and columns on the insulating substrate to define display elements, a plurality of switching elements for the respective picture element electrodes to which switching and data signals are applied from driver means, and a plurality of lens elements disposed between the insulating substrate and each picture element electrode;
 a second substrate opposed to the first substrate and having an electrode formed on an inner surface thereof; and
 a liquid crystal layer sandwiched between the first substrate and the second substrate.

BRIEF DESCRIPTION OF THE DRAWINGS

FIG. 1 is a schematic sectional view of a part of a LCD panel structure according to one embodiment of the invention;

DETAILED DESCRIPTION AND EMBODIMENTS OF THE INVENTION

Figure 2A:
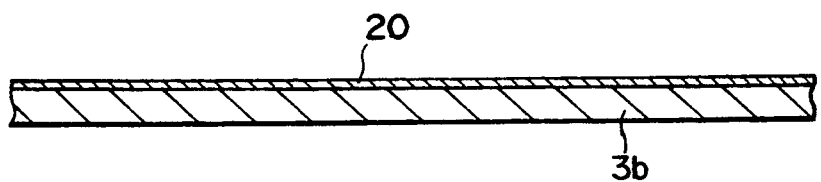
FIGS. 2a to 2e are schematic sectional views showing a first part of a sequence of fabricating a substrate having a polysilicon TFT and micro-lenses formed thereon according to the invention.
Figure 2B:
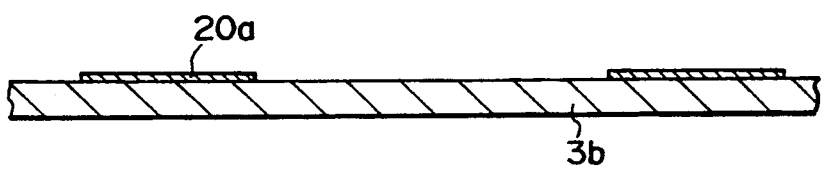

Reference is now made to the accompanying drawings and particularly, to FIG. 1. In the drawings, like reference numerals indicate like members or parts unless otherwise indicated.

Figure 5:
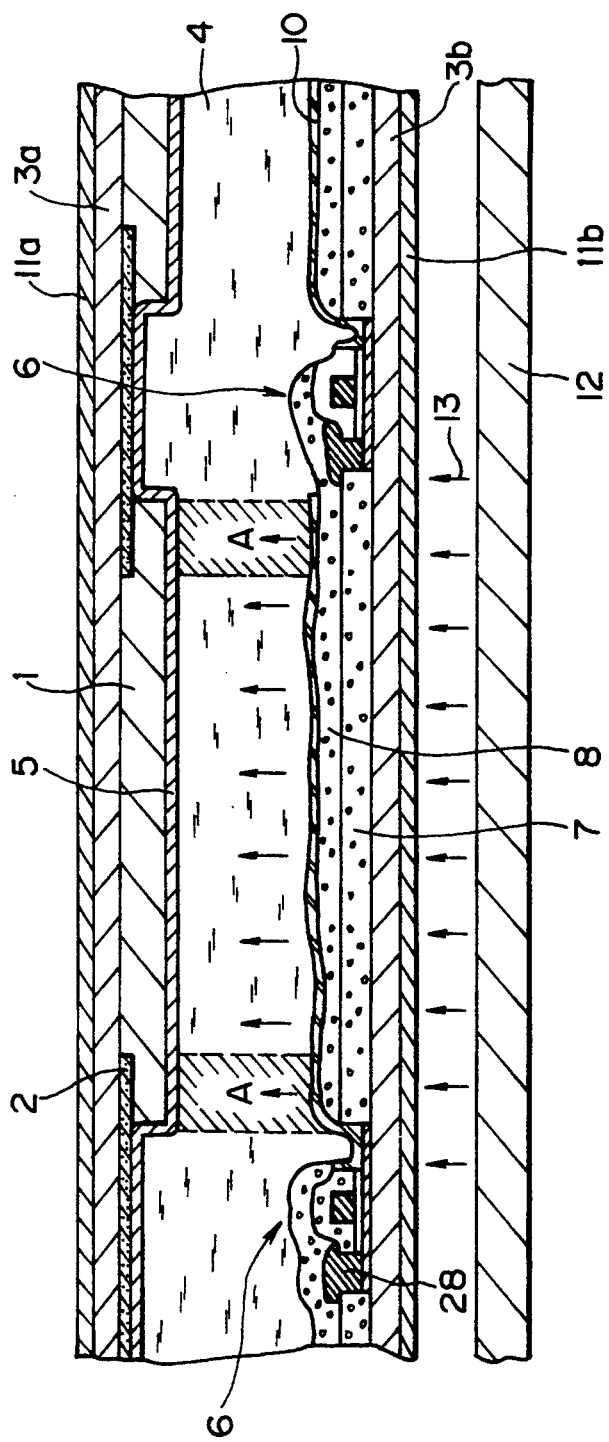
FIG. 5 is an illustrative schematic sectional view of a part of a known LCD panel structure.

In FIG. 1, there is shown a liquid crystal display device of the invention which has a similar structure as illustrated in FIG. 5 except that the PSG layer between the the substrate 3b and the TFT 6 is in the form of a lens (micro-lens).

More particularly, the LCD device of the invention includes a pair of optically transparent substrates 3a, 3b made, for example, of quartz. A liquid crystal layer 4 is sandwiched between the paired substrates 31, 3b. The substrate 3a has a color filter layer 1, a black matrix layer 2 and a common electrode 5 at a side opposed to the substrate 3b. The layers 1, 2 and the electrode 5 are provided between the substrate 3a and the liquid crystal layer 4 as shown. The color filter layer 1 has an opening defined by the black matrix layers 3 as shown in the figure. On the other hand, an active switching element 6, e.g. a thin film transistor (TFT), a first PSG layer 7, a second PSG layer 8 and a picture element electrode 10 made, for example, of ITO are provided between the substrate 3b and the liquid crystal layer 4. As stated with respect to FIG. 5, the TFT 6 drives the picture element electrode 10. The substrates 3a, 3b are provided with polarizing plates 11a, 11b, respectively, as in the case of FIG. 5. Light 13 is passed through a back light module 12.

In the practice of the invention, the first and second PSG layers 7, 8 are formed as a micro-lens as shown in FIG. 1. By this, light 13 passed from the back light module 12 is passed through the polarizing plate 11b, the quartz substrate 3b and is converged by means of the first and second PSG layers 7, 8 serving as a micro-lens at portions corresponding to the ends of the opening of the color filter 1. The thus converged light is transmitted through the picture element electrode 10 toward the opening alone at the side of the substrate 3a. In this embodiment, a micro-lens 26a is formed on the TFT 6-formed substrate 3b.

The fundamental unit element or panel of the LCD device has been illustrated in the figure. As a matter of course, a plurality of the unit elements are formed in a matrix to provide the LCD device as a whole.

Reference is now made to FIGS. 2 and 3 in order to illustrate a procedure of fabricating a substrate which has a polysilicon thin film transistor and a micro-lens according to the invention.

As shown in FIG. 2(a), an about 80 nm thick polysilicon layer 20 is formed on an entire surface of a quartz substrate 3b according to a low pressure CVD process. Then, the layer 20 is subjected to patterning to form polysilicon regions 20a serving as an active semiconductor layer as shown in FIG. 2 (b).

Figure 2C:
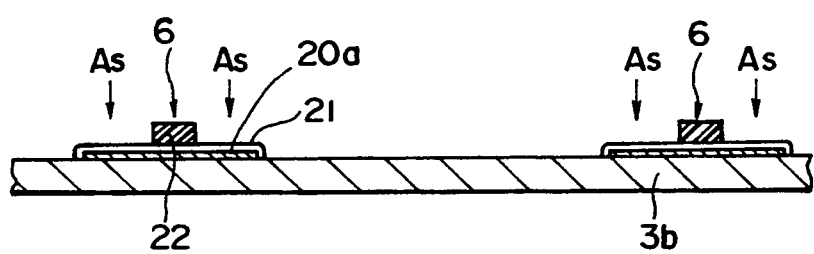

Thereafter, the substrate is subjected to thermal oxidation at a temperature of about 1000° C. to form an about 50 nm thick gate oxide film 21 only on each polysilicon region 20a as shown in FIG. 2(c). Further, an about 300 nm polysilicon layer is formed on the entire surface according to a low pressure CVD process, followed by selective dry etching to form polysilicon gate lines 22. Arsenic ions (As+) are ion implanted ($I^2$) through the gate oxide films 21 into the polysilicon regions 20a while using the polysilicon gate lines 22 as a mask under conditions of 160 KeV and $2 \times 10^{15}$ doses/cm$^2$. As a result, there is formed a source.drain (S/D) region 24 thereby forming the TFT 6.

Figure 2D:
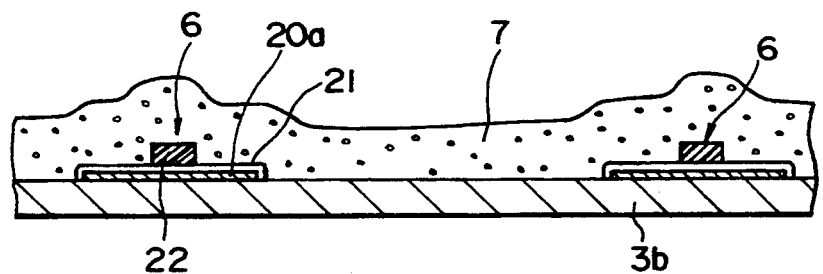

As shown in FIG. 2(d), an about 1000 nm thick first PSG film 7 is formed over the entire surface by an atmospheric pressure CVD process.

Figure 2E:
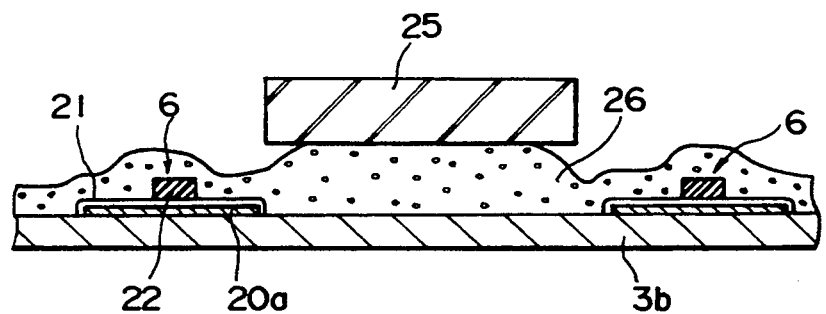

Thereafter, a resist mask 25 is formed on the first PSG film 7 in a region between the TFT transistors 6 according to lithography as shown in FIG. 2(e). The first PSG film 7 is subjected to half-etching wherein the film 7 is removed by etching to reduce the height by about ¼. By the etching, the film 7 is undercut or side etched at side ends of the resist mask 25 by isotropic etching as shown in FIG. 2(e). Thus, a lens-shaped PSG film 26 is formed. The etching is effected by use of hydrofluoric acid or nitric acid/hydrofluoric acid for wet etching. For dry etching, plasma etching is used.

Figure 3A:
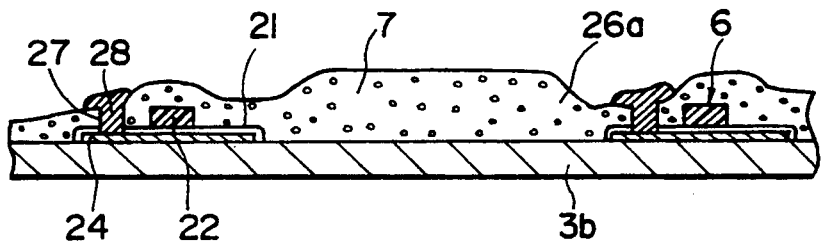
FIGS. 3a to 3d are schematic sectional views showing a latter part of the sequence of FIG. 2.

After formation of the lens-shaped PSG film 26, the resist mask 25 is removed as shown in FIG. 3(a) the source/drain (S/D) region 24 is annealed at a temperature of about 1000° C. and activated. During the annealing, the lens-shaped PSG film 26 is melted on the surface thereof by re-flow, thereby providing a micro-lens 26a having a more smoothed shape. After formation of the micro-lens 26a on the quartz substrate 3b, a first contact hole 27 is formed in the first PSG film 7 and an Al signal line 28 is formed in the contact hole 27, followed by formation of a second PSG film 8 over the entire surface, and further formation of a second contact hole 29 and an ITO picture element electrode 3, like known devices.

These steps are described in more detail.

After formation of the micro-lens 26a as in FIG. 3(a), the first contact hole (5×5 μm □) is formed as passing through the source/drain (S/D) region 24 by wet etching such as with a buffer hydrofluoric acid or by dry etching such as plasma RIE. Subsequently, an about 600 nm thick aluminium layer is sputtered over the entire surface, followed by wet etching with phosphoric acid or dry etching such as plasma RIE thereby forming the Al signal line 28.

Figure 3B:
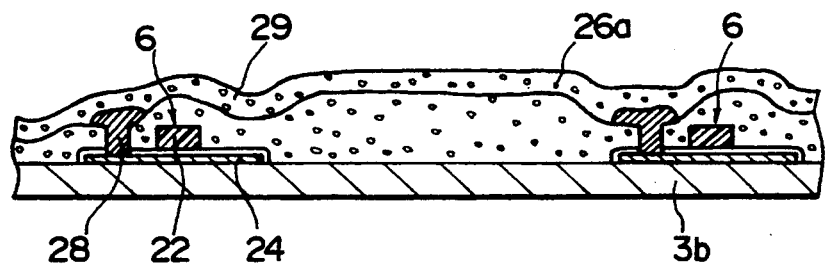
Figure 3C:
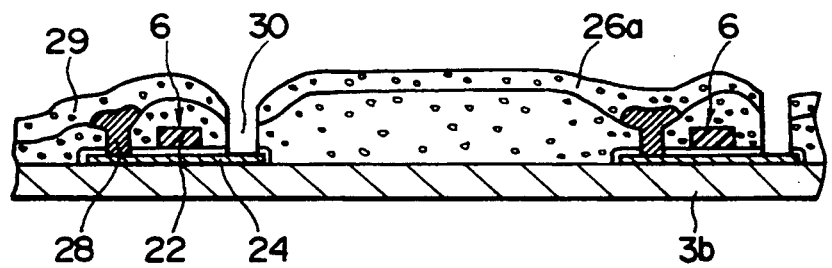

The second PSG film 29 is formed as a passivation film on the entire surface in a thickness of about 400 nm by the atmospheric CVD process as shown in FIG. 3(b). By this, the micro-lens 26a is thickened by the thickness of the second PSG film. Thereafter, a second contact hole 30 for picture element electrode is formed by drying etching such as plasma or RIE as shown in FIG. 3(c).

Figure 3D:
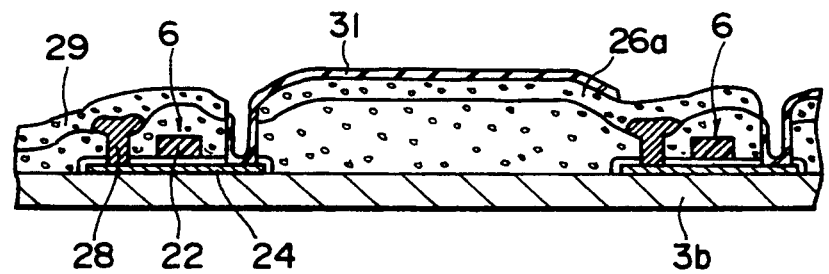

As shown in FIG. 3(d), ITO is formed over the entire surface in a thickness of about 150 nm by sputtering, followed by wet etching with hydrochloric acid (HCl) to form an ITO picture element electrode 31. Thus, there is obtained a LCD panel which includes the micro-lens 26a at the side of the substrate on which the TFT 6 has been formed.

In this manner, a plurality of unit elements can be formed on the substrate in a matrix or in rows and columns, thereby obtaining a liquid crystal display device.

Figure 4:
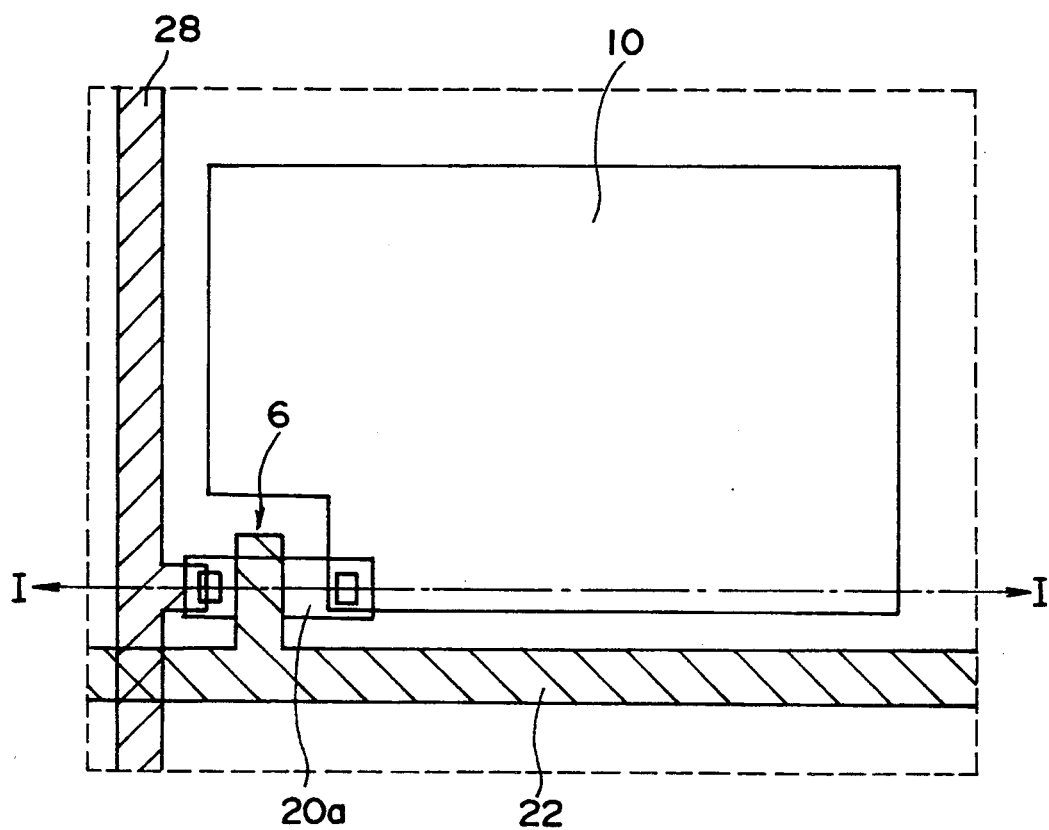
FIG. 4 is a plan view of a picture element portion according to the invention.

FIG. 4 is a plan view of a picture element. In the figure, there is shown a picture element electrode 10 which is driven with the TFT 6 constituted of a polysilicon region 20a and a polysilicon gate line 22. The TFT 6 is connected to the Al signal line 28. It will be noted that FIGS. 2 and 3 are, respectively, a section taken along the line I—I of FIG. 4.

As will be apparent from the foregoing, the liquid crystal display device of the invention has the micro-lenses so that light absorbed by the black matrix portions can be prevented, ensuring a high contrast ration in a white display mode. The micro-lenses can be formed by etching of the PSG layer which is a layer insulating film of the TFT and can be realized using existing processes.

What is claimed is:

1. A liquid crystal display device which comprises:
a first substrate;

a plurality of picture element electrodes arranged in a matrix formed on an inner surface of the first substrate;

a plurality of switching elements wherein each one of said plurality of picture element electrodes is associated with a corresponding one of said plurality of switching elements;

a plurality of lens elements formed on the inner surface of the first substrate, each lens element being separately disposed under a corresponding picture element electrode;

a second substrate opposed to the first substrate; and a liquid crystal layer disposed between the first substrate and the second substrate, wherein said plurality of lens elements are formed on a same plane with said plurality of switching elements.

2. A liquid crystal display device as claimed in claim 1, further comprising: an insulating layer formed between said plurality of picture element electrodes and said plurality of lens elements.

3. A liquid crystal display device as claimed in claim 2, wherein said insulating layer comprises of a PSG film.

4. A liquid crystal device as claimed in claim 1, wherein said plurality of lens elements are of a structure characterized by having been formed by chemical vapor deposition and etching.

5. A liquid crystal display device as claimed in claim 1, wherein said plurality of lens elements are comprised of a same material as a material of an insulating layer formed over said plurality of switching elements.

6. A liquid crystal display device which comprises:

a first substrate comprising an insulating substrate, a plurality of display elements formed in rows and columns on the first substrate, each of said plurality of display elements comprising a picture element electrode, a switching element electrically connected to the picture element electrode, and a lens element deposited between the first substrate and the picture element electrode;

a second substrate opposed to the first substrate and having an electrode formed on an inner surface thereof; and a liquid crystal layer sandwiched between the first substrate and the second substrate, wherein said plurality of lens elements are formed on a same plane with said plurality of switching elements.

7. A liquid crystal display device as claimed in claim 6, wherein said plurality of lens elements comprise a first PSG layer.

8. A liquid crystal display device as claimed in claim 7, further comprising: a second PSG layer formed between said first PSG layer and said picture element electrode.

9. A liquid crystal display device as claimed in claim 6, wherein said lens element is of a structure characterized by having been formed by chemical vapor deposition and etching.

10. A liquid crystal display device as claimed in claim 6, wherein said lens element is comprised of a same material as a material of an insulating layer formed over said switching element.

* * * * *